(12) United States Patent
Baucom et al.

(10) Patent No.: US 10,794,041 B2
(45) Date of Patent: Oct. 6, 2020

(54) STABILIZER PAD FOR A WORK MACHINE

(71) Applicant: Caterpillar Inc., Deerfield, IL (US)

(72) Inventors: Daniel D. Baucom, Rolesville, NC (US); Dennis E. Roberts, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 167 days.

(21) Appl. No.: 16/015,258

(22) Filed: Jun. 22, 2018

(65) Prior Publication Data

US 2019/0390439 A1    Dec. 26, 2019

(51) Int. Cl.
*E02F 9/08* (2006.01)
*B60S 9/02* (2006.01)
*B66C 23/78* (2006.01)

(52) U.S. Cl.
CPC ............... *E02F 9/085* (2013.01); *B60S 9/02* (2013.01); *B66C 23/78* (2013.01)

(58) Field of Classification Search
CPC .... E02F 9/085; B60S 9/02; B60S 9/12; B60S 9/10; B66C 23/78
See application file for complete search history.

(56) References Cited

U.S. PATENT DOCUMENTS

| | | | |
|---|---|---|---|
| 3,897,079 A | 7/1975 | Lagsdin et al. | |
| 3,930,668 A * | 1/1976 | Schuermann | E02F 9/085 280/763.1 |
| 4,066,234 A * | 1/1978 | Nycum | F16F 1/37 248/558 |
| 4,421,290 A * | 12/1983 | Frank | E02F 9/085 248/558 |
| 5,051,057 A | 9/1991 | Kremer | |
| 5,488,788 A | 2/1996 | Durbin | |
| 5,992,883 A * | 11/1999 | Lagsdin | B60S 9/02 280/763.1 |
| 6,109,650 A | 8/2000 | Lagsdin | |
| D441,711 S | 5/2001 | Lagsdin | |
| 6,227,570 B1 | 5/2001 | Martinez et al. | |
| 6,270,119 B1 * | 8/2001 | Lagsdin | B60S 9/02 212/304 |
| 6,422,603 B2 * | 7/2002 | Lagsdin | B60S 9/02 212/304 |
| D462,366 S | 9/2002 | Lagsdin | |
| D462,367 S | 9/2002 | Lagsdin | |
| 6,471,246 B1 | 10/2002 | Lagsdin | |
| D467,594 S | 12/2002 | Lagsdin | |

(Continued)

FOREIGN PATENT DOCUMENTS

GB    2459533    11/2009
JP    201352747    3/2013

*Primary Examiner* — Erez Gurari
(74) *Attorney, Agent, or Firm* — Calfee, Halter & Griswold LLP

(57) ABSTRACT

A stabilizer pad for use with stabilizer legs of a work machine is disclosed. The stabilizer pad may include a frame configured for attachment to the stabilizer leg of the work machine. The stabilizer pad may further include at least one resilient member including a plate member having one or more mounts. The resilient member may also include one or more resilient pads having longitudinal axes which are parallel to the plate member. The resilient pads may comprise at least one fiber reinforced elastomeric layer. A bottom or second surface of a resilient pad may define a continuous ground contact surface.

20 Claims, 10 Drawing Sheets

(56) References Cited

U.S. PATENT DOCUMENTS

| | | | |
|---|---|---|---|
| 6,513,783 B1* | 2/2003 | Alguera Gallego | B60S 9/02 248/188.1 |
| 6,634,672 B1 | 10/2003 | Lagsdin | |
| 6,726,246 B2 | 4/2004 | Lagsdin | |
| 6,986,530 B2 | 1/2006 | Lagsdin | |
| 7,040,659 B2 | 5/2006 | Lagsdin | |
| 7,073,821 B2* | 7/2006 | Lagsdin | B60S 9/02 248/633 |
| 7,172,216 B1 | 2/2007 | Lagsdin | |
| D562,355 S | 2/2008 | Lagsdin | |
| D567,824 S | 4/2008 | Lagsdin | |
| 7,401,812 B2 | 7/2008 | Lagsdin | |
| 7,802,814 B2* | 9/2010 | Lagsdin | B66C 23/78 280/763.1 |
| 7,900,962 B2 | 8/2011 | Lagsdin | |
| 8,262,132 B1* | 9/2012 | Lagsdin | E02F 9/085 248/188.9 |
| 8,998,164 B2* | 4/2015 | Marquardt | A47B 91/06 248/188.9 |
| 2002/0036403 A1* | 3/2002 | Lagsdin | B60S 9/02 280/763.1 |
| 2003/0011181 A1* | 1/2003 | Lagsdin | B60S 9/02 280/763.1 |
| 2004/0056465 A1* | 3/2004 | Lagsdin | B60S 9/02 280/763.1 |
| 2004/0178617 A1* | 9/2004 | Lagsdin | B60S 9/12 280/763.1 |
| 2004/0208737 A1 | 10/2004 | Schmidtlein | |
| 2006/0011800 A1* | 1/2006 | Lagsdin | B66C 23/78 248/615 |
| 2017/0089015 A1* | 3/2017 | Penland, Jr. | B32B 15/095 |
| 2018/0094403 A1* | 4/2018 | Nobles | B60S 9/02 |
| 2019/0064844 A1* | 2/2019 | Theander | G05G 9/047 |
| 2019/0390439 A1* | 12/2019 | Baucom | B60S 9/02 |

* cited by examiner

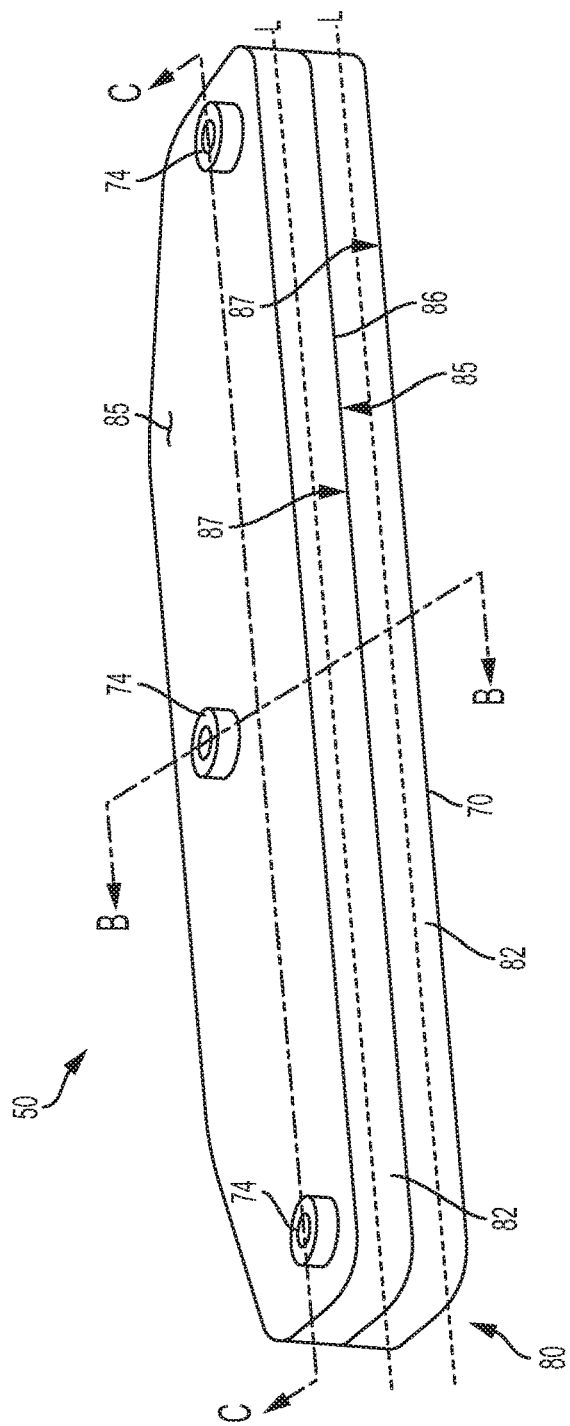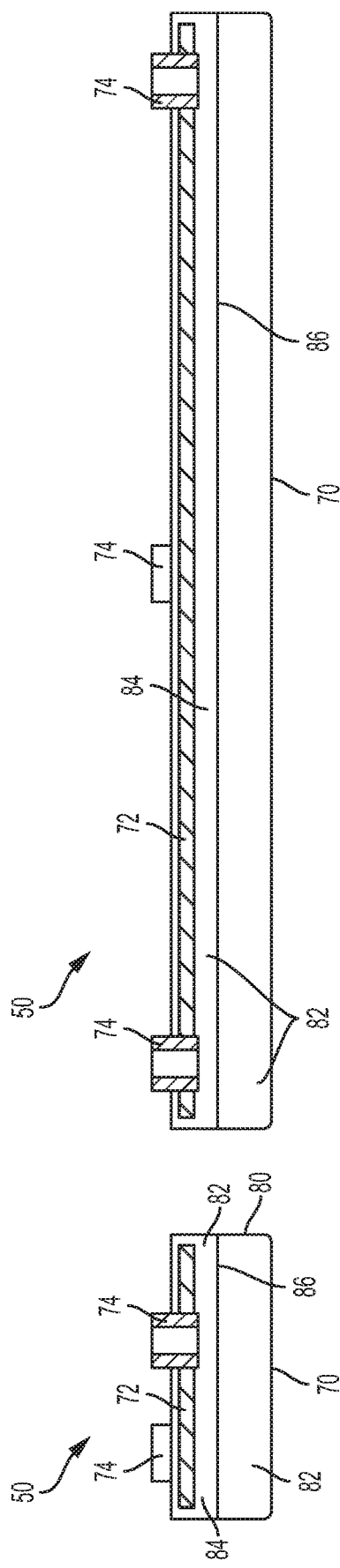

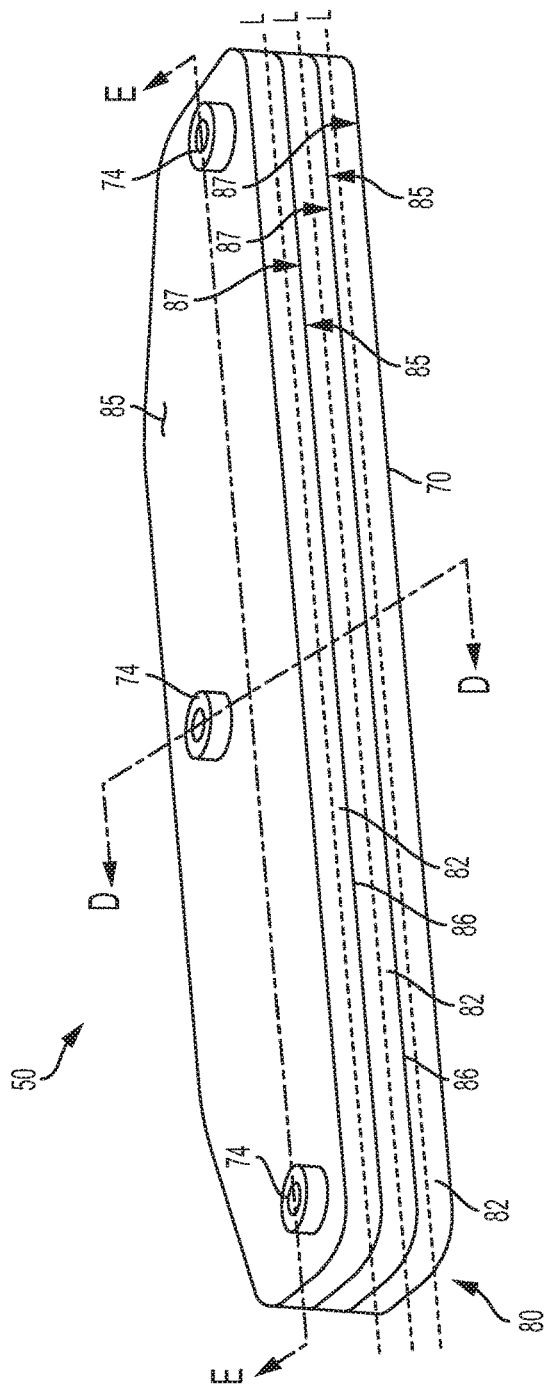
FIG. 11
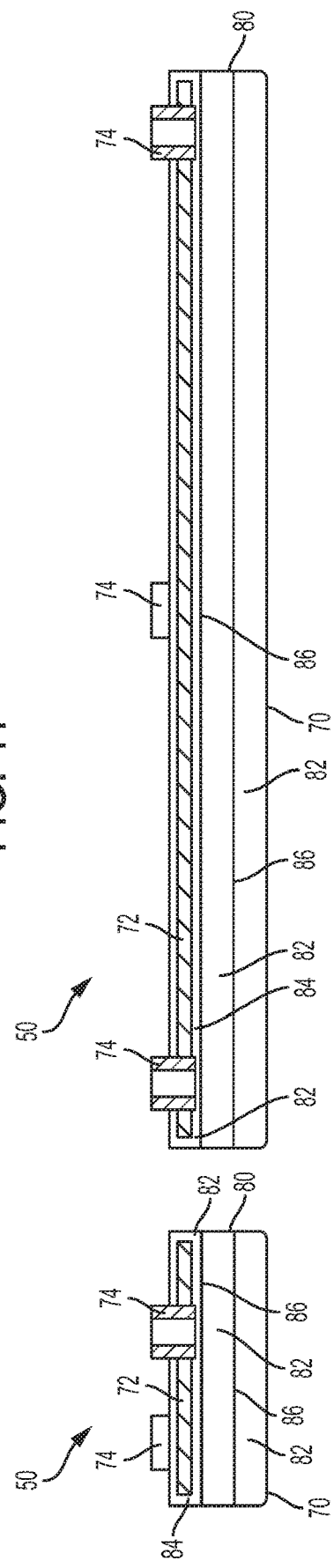
FIG. 13
FIG. 12

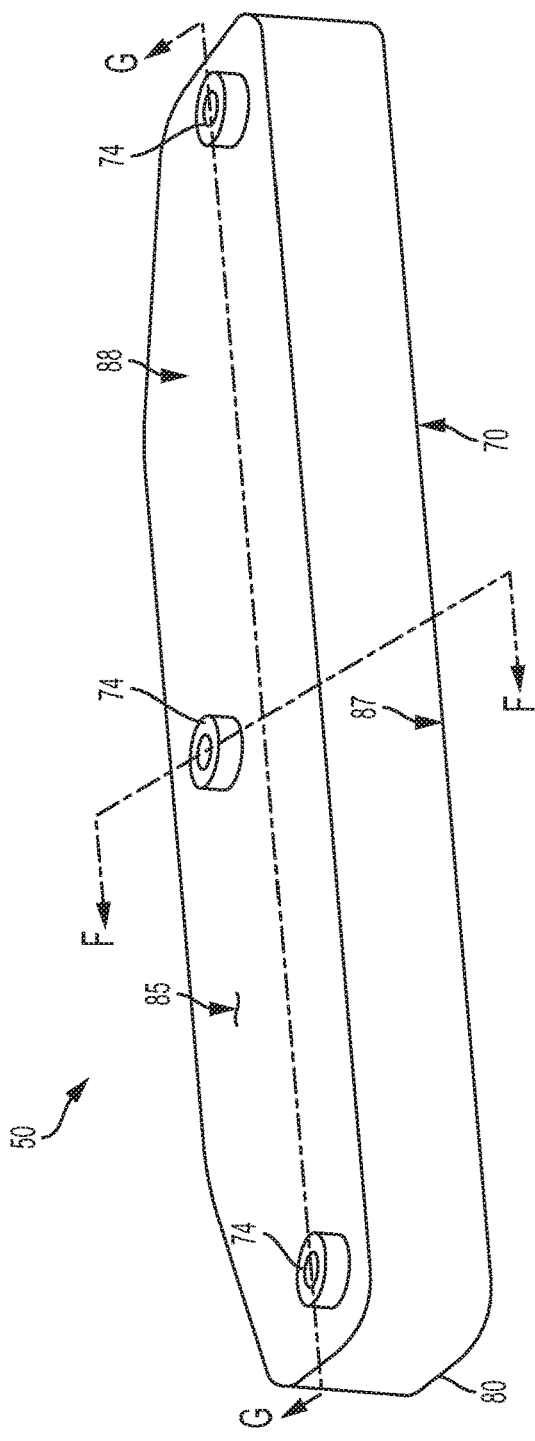
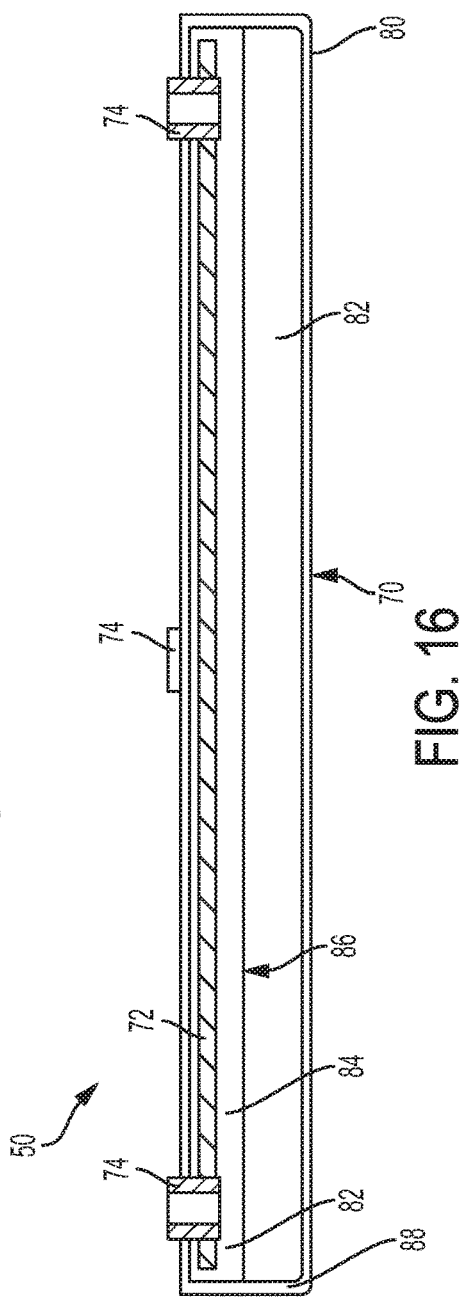
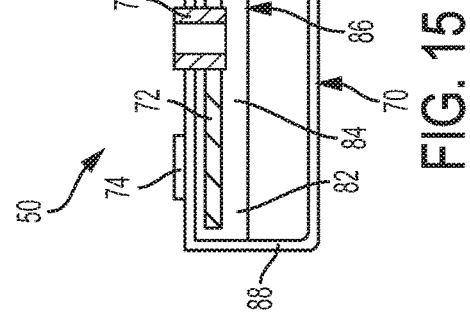
FIG. 14
FIG. 15
FIG. 16

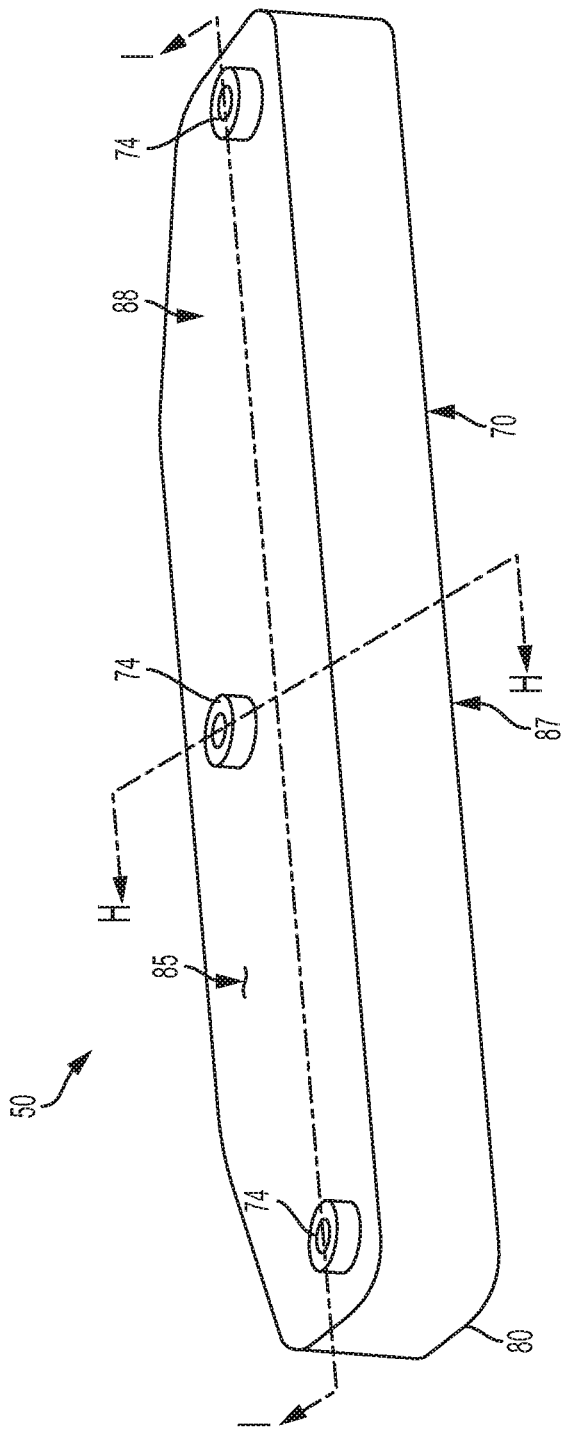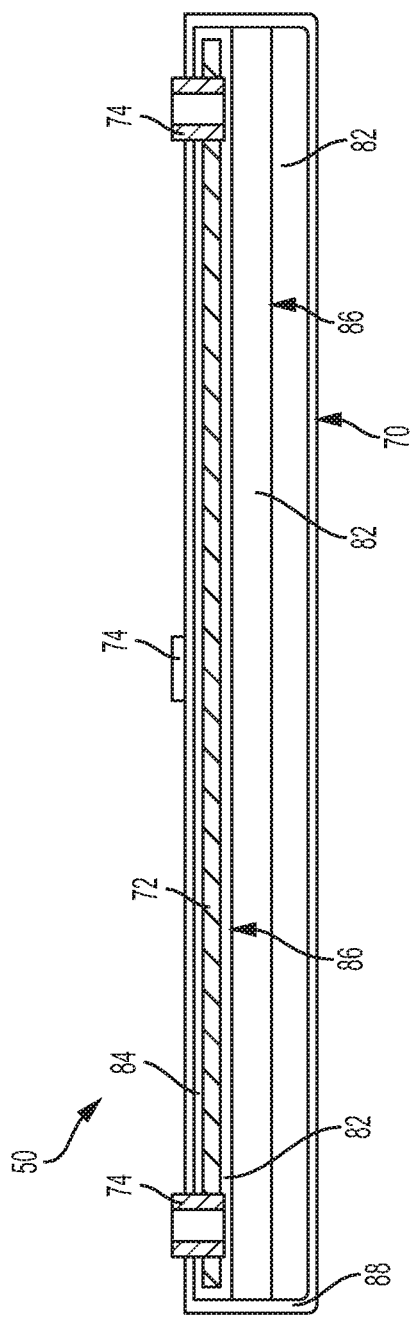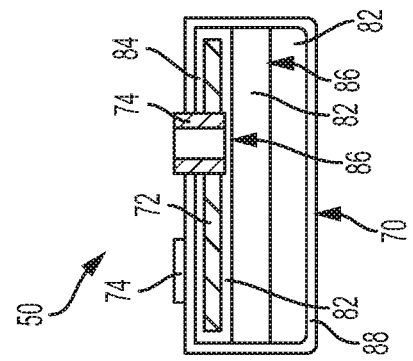

STABILIZER PAD FOR A WORK MACHINE

TECHNICAL FIELD

The present disclosure generally relates to a stabilizer pad for a work machine, and more specifically to a stabilizer pad having a horizontal bottom surface when the stabilizer pad is in contact with the ground.

BACKGROUND

Many types of mobile work machines have stabilizer legs or outriggers that extend downwardly and outwardly from opposite sides of the machine. During various digging and excavating operations executed using a work implement of the machine, the stabilizer legs engage the ground to laterally support the machine. In this manner, stabilizer legs aid in maintaining a steady and solid working foundation, as well as guarding against possible tipping of the machine. Stabilizer legs may be hydraulically operated, for example, to extend, retract, lower or raise their positions depending on the topography and/or work environment in which the machine is operating. Additionally, stabilizer legs may include stabilizer pads disposed at the distal ends of the stabilizer legs for engaging the ground surface.

Stabilizer pads have conventionally been disposed at the distal ends of stabilizer legs and include at least one side adapted for engaging the ground surface. For example, the stabilizer pad may include a resilient member comprising a rubber or other pliable material for contacting paved surfaces, such as asphalt or concrete. The stabilizer pad may also include a second side for contacting other surfaces and the stabilizer pad may be reversible so that it may be rotated so as to employ the appropriate side, depending on the ground surface on which the machine is operating. Each side may have a ground contacting surface which engages the ground surface.

As the stabilizer pads often transfer large forces from the heavy vehicle and the additional loads to the ground, it is known to coat at least the ground contacting surface with a relatively soft, pliable material, such as rubber, to prevent damage to the surface. Traditional stabilizer pads may include a resilient pad which includes a ground contacting surface which is made from a solid piece of rubber. However, such solid pieces of rubber are more expensive to manufacture and become damaged more easily, often resulting in large portions of the rubber resilient pad chunking or breaking off, requiring the pads to be replaced more frequently. As such, it has been known to use resilient pads comprising masticated rubber, which is a fiber reinforced elastomeric material, as masticated rubber has enhanced grip and wear properties and a lower cost to produce than traditional rubber. However, because masticated rubber is produced in sheets, the sheets must be stacked together to produce a resilient member for a stabilizer pad.

U.S. Patent Application Number 2004/0208737, titled "Backhoe/loader bucket design, attachment, and method for converting existing buckets," discloses a horizontal backhoe stabilizer pad which is removably attached to a rigid support means. However, this Patent Application discloses only a stabilizer pad which is a semi rigid non-abrasive composite material and affixes the stabilizer pad and the rigid support means to the back side of the backhoe bucket such that the pad contact surface engages the ground when the bucket is essentially fully curled. Accordingly, a stabilizer pad is needed which has a horizontal ground contacting surface, is easy to manufacture, and has increased grip and wear properties.

SUMMARY

In accordance with aspects of this disclosure, there are provided stabilizer pads for a work machine. The stabilizer pads include a frame attachable to a stabilizer leg, a resilient member, and a connector for securing the resilient member to the frame. The resilient member includes a plate member having one or more mounts configured for attachment to the frame, a first resilient pad defining an elastomeric envelope which substantially surrounds the plate member and one or more mounts, and a second resilient pad disposed beneath and attached to the first resilient pad. The first and second resilient pads include at least one fiber reinforced elastomeric layer and are substantially parallel to the frame.

In accordance with other aspects, there are provided resilient members for use with a stabilizer pad of a work machine. The resilient members include a plate member including one or more mounts configured for attachment to the stabilizer leg, a first resilient pad defining an elastomeric envelope which substantially surrounds the plate member, and a second resilient pad disposed beneath and attached to the first resilient pad. The first and second resilient pads include at least one fiber reinforced elastomeric layer.

In accordance with other aspects, there are provided resilient members for use with a stabilizer leg of a work machine. The resilient members include a plate member including one or more mounts configured for attachment to the stabilizer leg, a first resilient pad defining an elastomeric envelope which substantially surrounds the plate member, a second resilient pad attached beneath the first resilient pad, a third resilient pad attached beneath the second resilient pad, a first fabric layer disposed between the first and second resilient pads, a second fabric layer disposed between the second and third resilient pads, and an elastomeric coating substantially surrounding the plate member and first, second, and third resilient pads. The first, second, and third resilient pads include at least one fiber reinforced elastomeric layer. The first second, and third resilient pads are substantially parallel to the plate member and a bottom surface of the third resilient pad defines a substantially continuous ground contact surface that is substantially parallel to the resilient member frame.

BRIEF DESCRIPTION OF THE DRAWINGS

Further features and advantages of the invention will become apparent from the description of embodiments using the accompanying drawings. In the drawings:

FIG. 8 is a perspective view of a first exemplary resilient member having two resilient pads;

FIG. 9 is a partial cross-sectional view taken along line B-B of the exemplary resilient member of FIG. 8;

FIG. 10 is a partial cross-sectional view taken along line C-C of the exemplary resilient member of FIG. 8;

FIG. 11 is a perspective view of a second exemplary resilient member having two resilient pads;

FIG. 12 is a partial cross-sectional view taken along line D-D of the exemplary resilient member of FIG. 11;

FIG. 13 is a partial cross-sectional view taken along line E-E of the exemplary resilient member FIG. 11;

FIG. 14 is a perspective view of the first exemplary resilient member of FIG. 8 including an elastomeric coating;

FIG. 15 is a partial cross-sectional view taken along line F-F of the exemplary resilient member of FIG. 14;

FIG. 16 is a partial cross-sectional view taken along line G-G of the exemplary resilient member of FIG. 14;

FIG. 17 is a perspective view of the second exemplary resilient member of FIG. 11 including an elastomeric coating;

FIG. 18 is a partial cross-sectional view taken along line H-H of the exemplary resilient member of FIG. 17; and FIG. 19 is a partial cross-sectional view taken along line I-I of the exemplary resilient member of FIG. 17.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
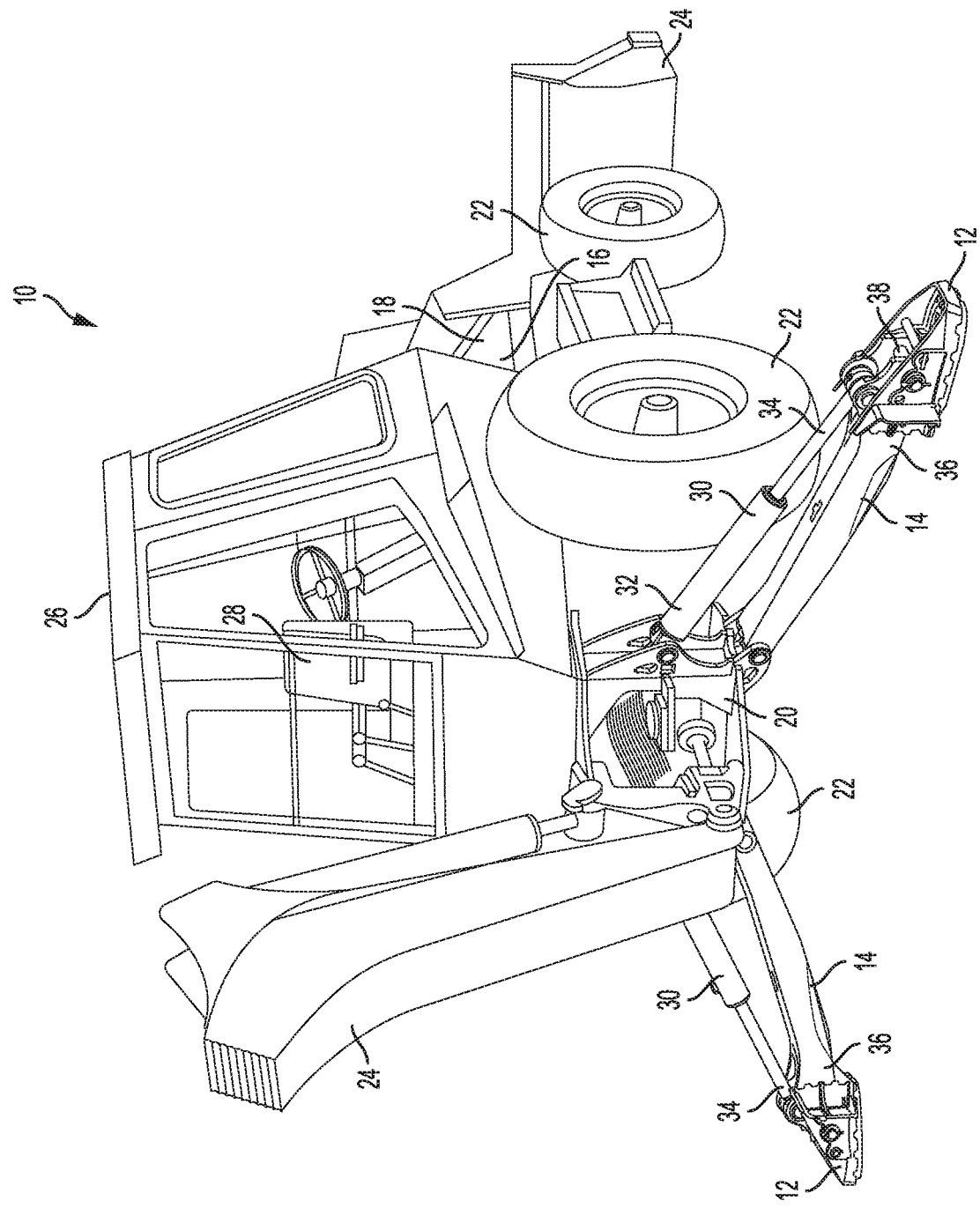
FIG. 1 is a perspective view of an exemplary work machine having stabilizer legs equipped with stabilizer pads.
Figure 2:
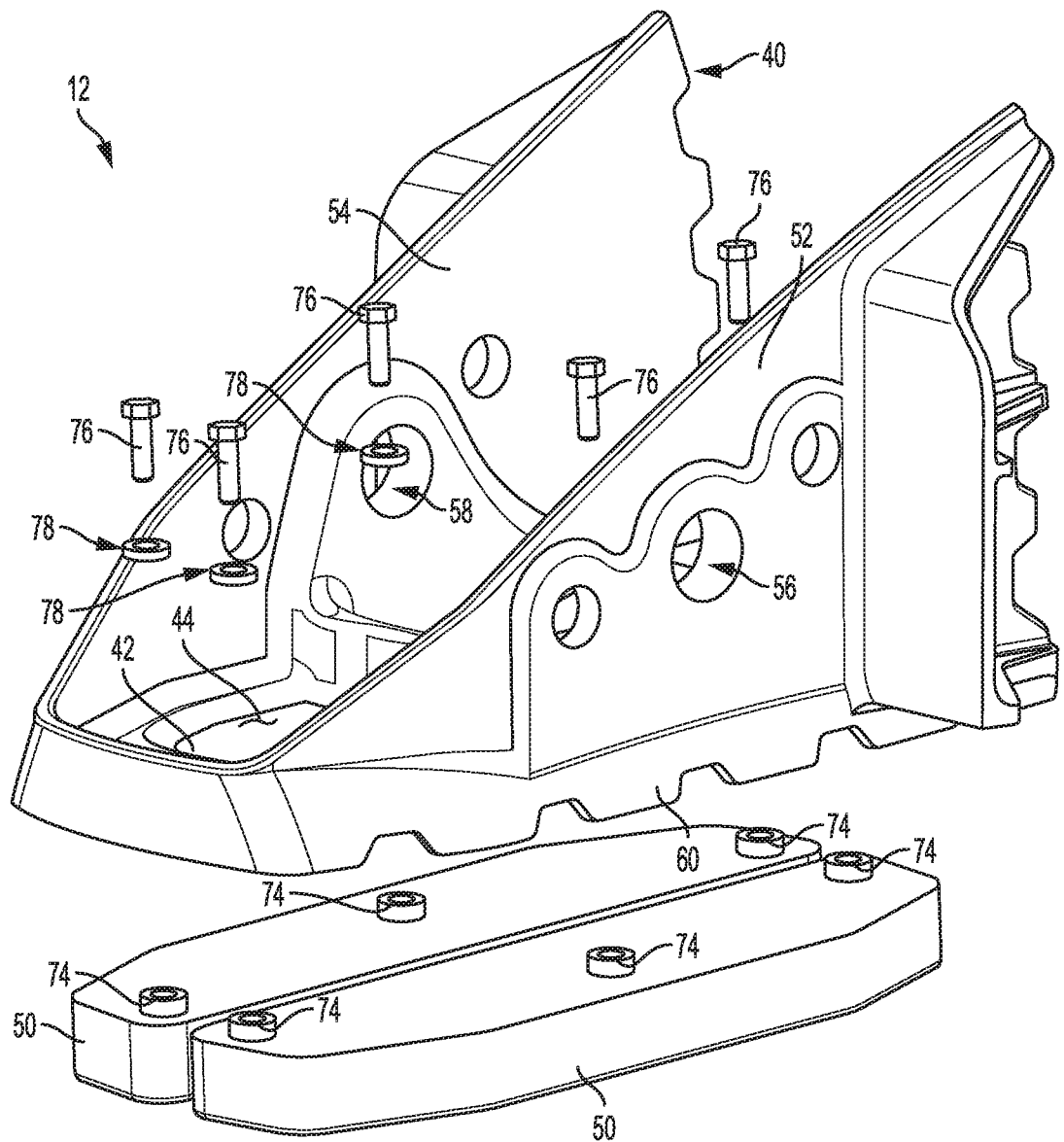
FIG. 2 is an exploded perspective view of an exemplary stabilizer pad that may be used in conjunction with the stabilizer legs of the work machine of FIG. 2.

Referring to FIG. 1, a work machine 10, such as a backhoe loader, is shown that incorporates a pair of stabilizer pads 12 for a pair of stabilizer legs 14. Although the presently disclosed stabilizer pad 12 is shown in operative association with the stabilizer legs 14 of a backhoe loader, it should be understood that the presently disclosed stabilizer pad 12 may be incorporated on any suitable work machine 10. The work machine 10 may be any machine that performs operations associated with an industry such as construction, farming, mining or any other industry known in the art. For example, the work machine 10 may be an earth moving machine such as a loader, a backhoe, an excavator, a crane, a utility vehicle or any other earth moving machine, heavy machinery or mobile system.

With regard to FIG. 1, the work machine 10 includes a machine frame 16 with front end 18 and rear end 20 portions. The machine 10 may further include at least one traction device 22 configured to support the machine frame 16, and a power source, i.e., an engine (not shown) supported by the machine frame 16 and configured to drive the at least one traction device 22 to propel the machine 10. In addition, the machine 10 may include at least one work implement 24 supported by the machine frame 16. The implement 24 may include any work tool used for the performance of a task by the respective machine. For example, the implement may be a blade, a bucket, a shovel, a ripper, a dump bed, a propelling device or any other task-performing device known in the art. A cab 26 is mounted on the frame 16 in a well-known manner and includes a seat 28 therein for occupation by the machine operator. The seat 28 may swivel between the front end 18 and the rear end 20 directions.

In the illustrated embodiment, the pair of stabilizer legs 14 is secured on the rear end 20 portion of the frame 16 in a conventional manner. However, it will be appreciated that the pair of stabilizer legs 14 may be secured on the front end 18 of the frame 16 or stabilizer legs 14 may be secured on the front and rear ends 18, 20 of the frame 16. During operation of the machine 10, engagement of the stabilizer legs 14 with the ground surface prevents or minimizes movement of the machine 10. The stabilizer legs 14 are movable between an extended (shown) and retracted position. It should be understood that the stabilizer legs 14 may be positioned at any one of a plurality of positions including raised and lowered as required during operation of the machine 10. Movement of the stabilizer legs 14 may be accomplished through a pair of hydraulic cylinders 30. Each one of the hydraulic cylinders 30 is connected in a well-known manner at a first end 32 to the frame 16 and at a second end 34 to a respective one of the pair of stabilizer legs 14. The stabilizer pad 12 may be connected in a well-known manner to a distal end 36 of the stabilizer leg 14, as shown in FIG. 1. For example, the connection between the stabilizer pad 12 and the stabilizer leg 14 may include a pin 38 that extends through the distal end 36 of the stabilizer leg 14 and also through the stabilizer pad 12. The attachment of the stabilizer pad 12 to the stabilizer leg 14 using the pin 38 allows for pivoting of the stabilizer pad 12 with respect to the stabilizer leg 14. However, any conventional retainers or fasteners known in the art may be employed to secure the stabilizer pad 12 to the stabilizer leg 14.

Turning to FIGS. 1 through 5, the presently disclosed stabilizer pad 12 includes a frame 40 configured for attachment to the stabilizer leg 14. While the presently disclosed stabilizer pad 12 is illustrated as a cast steel frame, it should be understood that the frame 40 may be fabricated from independent elements welded together or otherwise joined by any manner known in the art. Likewise, the frame 40 may include burn-to-shape elements and/or may further include various elements machined into the frame 40 or through the frame 40 entirely. The frame 40 may include a substantially planar support plate 42 having a first side 44 and a second side 46. When mounted on the stabilizer leg 14, the first side 44 of the support plate 42 faces the stabilizer leg 14 while the second side 46 faces the ground surface on which the machine 10 is positioned. The stabilizer pad 12 also includes one or more resilient members 50 that extend from the support plate second side 46 in the direction of the ground surface, as described in detail below.

The stabilizer pad 12 may incorporate first and second lateral walls 52, 54 that extend from the first side 44 of the support plate 42. Further, the first and second lateral walls 52, 54 may extend from opposite sides of the support plate 42 and may be configured for attachment to the distal end 36 of the stabilizer leg 14. As described above, the stabilizer pad 12 may be pivotally secured to the stabilizer leg 14 with the pin 38, which extend through the stabilizer leg 14 and the first and second lateral walls 52, 54 of the stabilizer pad 12 (see FIGS. 1 and 2). Specifically, the first and second lateral walls 52, 54 may be provided with openings 56, 58 for receiving the pin 38, the openings 56, 58 corresponding with openings in the stabilizer leg 14 when the stabilizer pad 12 is mounted thereon.

In an alternative embodiment, because the stabilizer pad 12 may pivot relative to the stabilizer leg 14, the support plate first side 44, which faces the stabilizer leg 14, may be provided with stop notches (not pictured) which function to limit the degree to which the stabilizer pad 12 may pivot. For example, should the end of the stabilizer pad 12 opposite the stop notches pivot in a downward direction due to weight or otherwise, the stop notches may provide a contact point with the stabilizer legs 14 thereby limiting the downward pivoting of the stabilizer pad 12. In this manner, the stabilizer pad 12 may remain relatively parallel to the ground surface before and during engagement therewith.

In a further alternative embodiment, a third lateral wall (not shown) may also extend from the support plate first side 44. The third lateral wall may be disposed between the first and second lateral walls 52, 54, which extend from opposite sides of the support plate first side 44 and may be disposed toward the distal end of the stabilizer pad 12. The third lateral wall may include an opening that is configured to accommodate a tie down device such as a chain or cable. Specifically, a tie down device may be used to further secure the stabilizer pad 12 to the ground surface, thereby providing additional stabilization when necessary. While not shown in the figures, it should be understood that the support plate 42 may include additional openings (threaded or otherwise) or fastening mechanisms configured to receive bolt-on attachments to the stabilizer pad 12. Such bolt-on attachments may be utilized so as to effectively increase the width of the stabilizer pad 12 and/or the functionality of the stabilizer pad 12.

The stabilizer pad 12 may also include bores or openings 66 in the support plate 42 which may receive a fastener or connector to secure the resilient members 50 to the stabilizer pad 12, as will be described in detail below. The openings 66 extend from the support plate first side 44 to the support plate second side 46 and may be threaded or unthreaded. In a further embodiment, the frame 40 may also include traction walls 60 extending from opposite sides of the frame 40 in the direction of the ground surface. While the traction walls 60 extend in the same direction as the resilient member 50 i.e., toward the ground surface, the resilient members 50 extend farther from the frame 40 than the traction walls 60. In this manner, the resilient members 50 function as the ground contact surface of the stabilizer pad 20 while the traction walls 60 may function as a second ground contact surface of the stabilizer pad 12. The traction walls 60 include rigid protruding portions or grousers which extend downwardly from the frame which may penetrate a ground surface and provide additional traction to the stabilizer pad 12.

Figure 3:
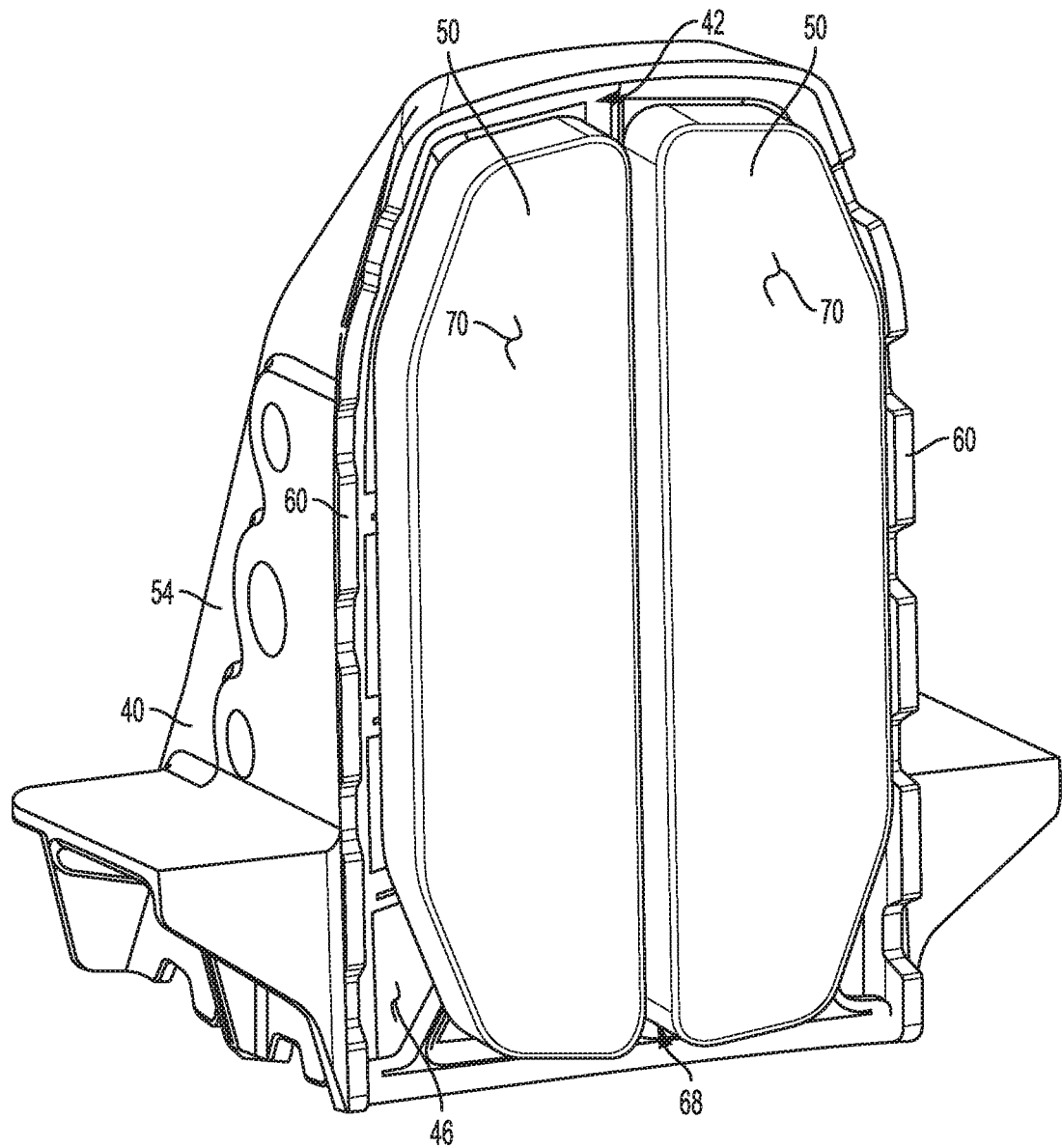
FIG. 3 is a lower perspective view of an exemplary stabilizer pad that may be used in conjunction with the stabilizer legs of the work machine of FIG. 2.
Figure 4:
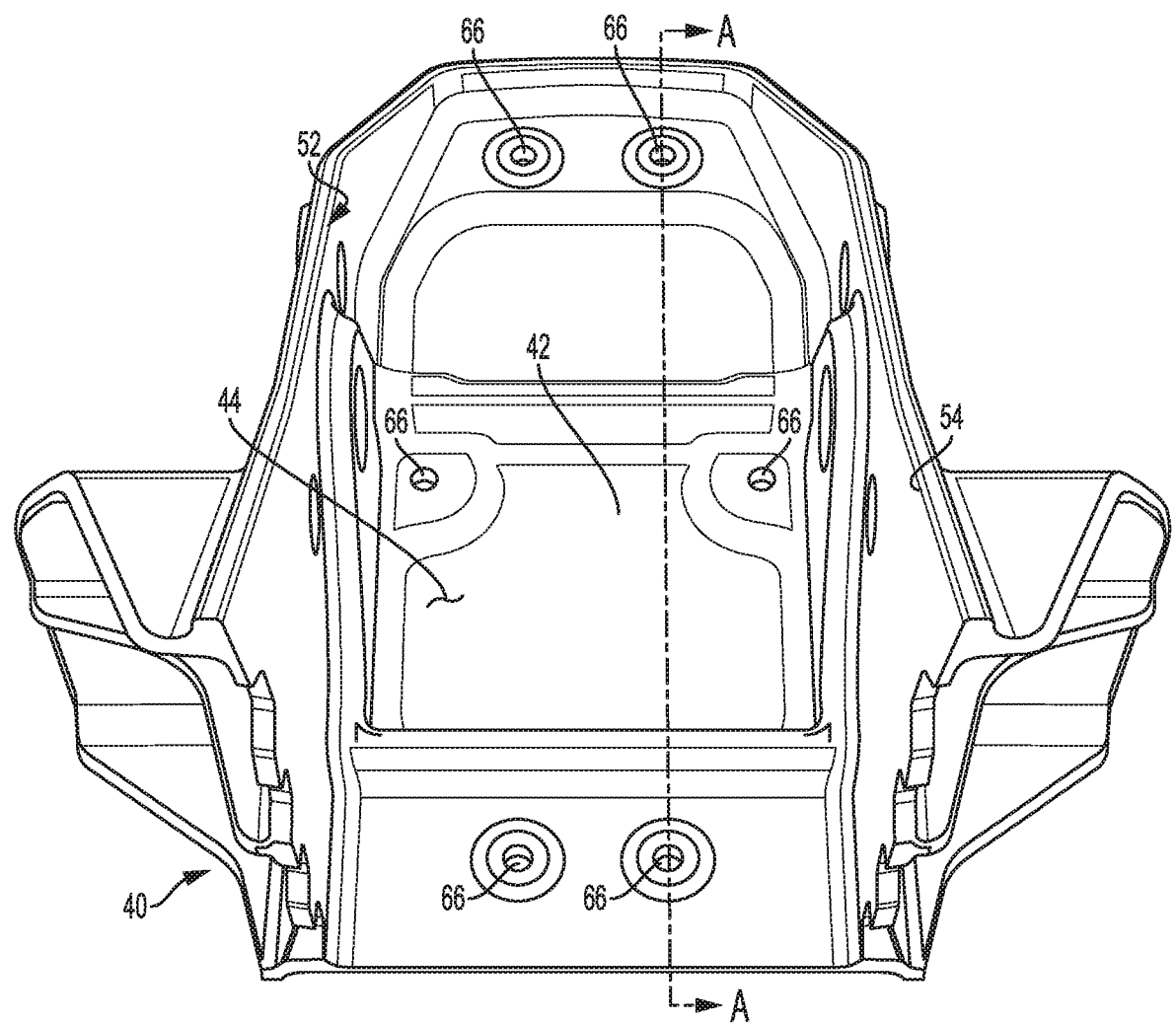
FIG. 4 is a top perspective view of a frame of an exemplary stabilizer pad without a resilient member attached thereto.

The stabilizer pad 12 further includes one or more resilient members 50 that extend from the support plate second side 46 toward the ground surface on which the machine 10 is positioned. While the presently disclosed stabilizer pad 12 is shown as having two resilient members 50, it should be understood that any number of resilient members 50 are within the scope of this disclosure, including one or more. Where the stabilizer pad 12 is provided with more than one resilient member 50, the resilient members 50 may be arranged such that a space 68 extends partially or completely between the resilient members 50. Further, while the disclosed resilient members 50 are depicted as elongated and generally rectangular, with tapered portions at the ends, it should be understood that the resilient members 50 may take any alternate shape having a continuous bottom or ground contact surface, as described below. The resilient member 50 has a ground contact surface 70 which is disposed opposite the second side 46 of the support plate 42. As shown in FIG. 3, the resilient members 50 extend farther from the frame 40 (in the direction of the ground surface) than the traction walls 60 or other portions of the frame 40. In this manner, ground contact surface 70 of the resilient members 50 serve as the first or only ground contact surface of the stabilizer pad 12. The resilient members are generally formed from a pliable material, such as an elastomeric material, as described in detail below.

Figure 5:
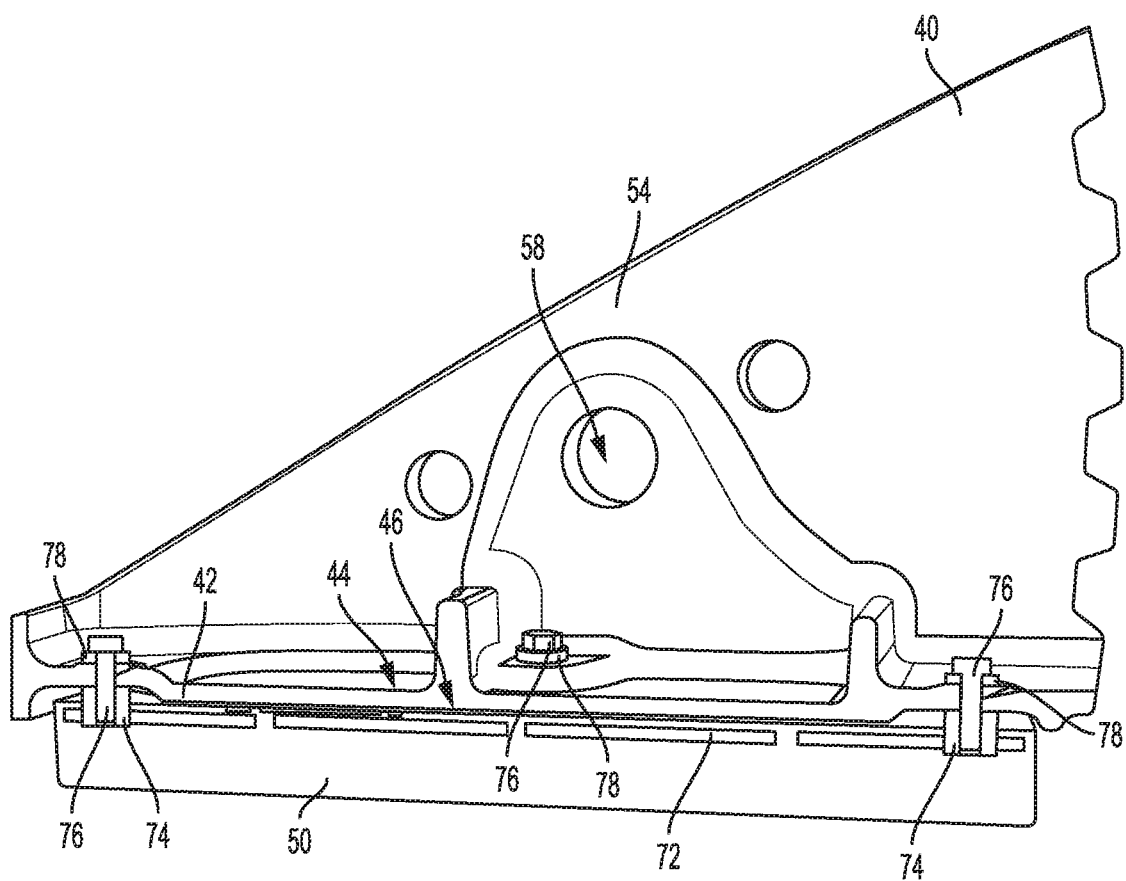
FIG. 5 is a cross-sectional perspective view taken along line A-A of the frame of the exemplary stabilizer pad of FIG. 4 with a resilient member attached thereto.
Figure 6:
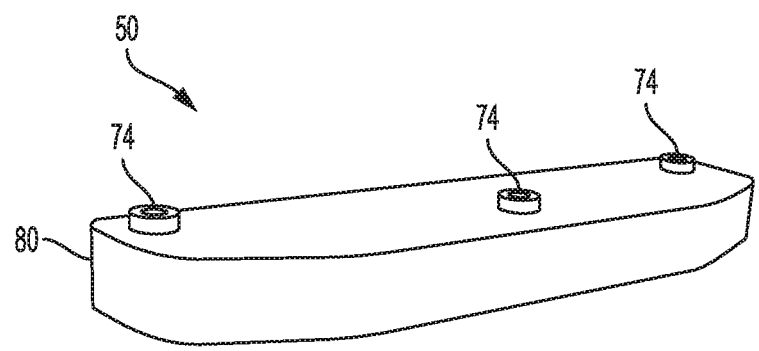
FIG. 6 is a top perspective view of an exemplary resilient member.
Figure 7:
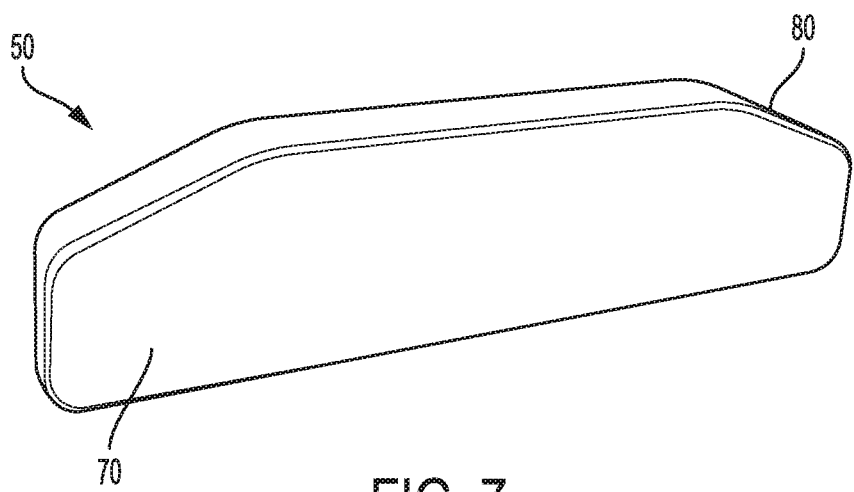
FIG. 7 is a lower perspective view of the exemplary resilient of FIG. 6.

Referring now to FIGS. 6 through 19, the resilient members 50 may include a plate member 72 that facilitates mounting of the resilient member 50 to the frame 40. The plate member 72 may have a first side 73 which is oriented toward the frame 40 when the resilient member 50 is attached to the frame 40 and a second side 75 which is oriented away from the frame 40 when the resilient member 50 is attached to the frame 40. The plate member 72 may also contribute to the durability of the resilient member 50. FIGS. 9 and 10 and FIGS. 12 and 13, partial cross-sectional views taken along lines B-B and C-C of FIG. 8 and lines D-D and E-E of FIG. 11, respectively, illustrate a resilient member 50 having a plate member 72 disposed within the resilient member 50. The plate member 72 may be a steel plate. In a preferred embodiment, the plate member 72 in non-continuous and has openings disposed along the plate 72 (FIG. 5). However, other embodiments are contemplated. For example, the plate 72 may be a continuous piece and/or the plate 72 may be another material, such as iron.

Fasteners, mounts, or other mounting features, depicted in FIGS. 2 and 5 through 19 as threaded bosses 74, may also extend from or through and out of the resilient member 50 such that the resilient member 50 may be attached to the frame 40. The mounts 74 may extend from the plate member 72 or may extend from or otherwise be secured to the first side 73 of the plate member 72. In a preferred embodiment, the mounts 74 correspond to the openings 66 in the support plate 42 when the resilient member 50 is mounted on the frame 40. In the illustrated embodiment, the resilient member 50 includes three threaded bosses 74. Two threaded bosses 74 are disposed at the elongated ends, located near the medial portion of the resilient member 50, close to the space 68 between resilient members 50 when two resilient members 50 are mounted on the frame 40. The other threaded boss 74 is disposed substantially in the middle of the lateral portion of the resilient member 50. However, it will be appreciated that any number or position of threaded bosses 74 may be used. The threaded bosses 74 may traverse the plate member 72 and ultimately be aligned with the support plate openings 66 of the stabilizer pad frame 40 such that a connector, illustrated as a bolt 76, may be received in each threaded boss 74 and the corresponding support plate opening 66, thereby facilitating attachment of the resilient member 50 to the frame 40. The stabilizer pad 12 may further include a washer 78 disposed on the bolt 76 between the head of the bolt 76 and the portion of the frame 40 defining the opening 66 to further facilitate attachment of the resilient member 50 to the frame 40. While the stabilizer pad 12 has been described as having a bolt 76 which connects the frame 40 and resilient member 50, the connector may be any other connecting mechanism known in the art. For example, the connector may be a fastener, chain, adhesive, nail, screw, etc.

While the resilient member 50 has been described as including threaded bosses 74 which correspond to support plate openings 66 whereby the threaded bosses 74 and support plate openings 66 may receive a bolt 76 to thereby secure the resilient member 50 to the frame 40, other embodiments are contemplated. For example, the resilient member 50 may include fasteners such as bolts which may be received in the openings 66 in the support plate 42 of the stabilizer pad frame 40, thereby facilitating attachment of the resilient member 50 to the frame 40. In such an embodiment, fastening mechanisms, such as nuts, disposed at the first side 44 of the support plate 42 on the distal end of the bolts may secure the resilient member 50 to the support plate 42. Any fastener known in the art may be employed for attaching the resilient member 50 to the frame 40, including, but not limited to, screws, anchors, nails, clips, pins, staples, etc. Such fasteners may be secured to the plate member 72 before the overmolding of the pliable material thereto. Such a configuration may allow for an independent resilient member 50 to be readily mounted from or mounted to the stabilizer pad frame 40. Likewise, a worn or damaged resilient member 50 may be easily replaced with a new resilient member 50. Specifically, replacement of a worn resilient member 50 simply requires removal of bolts 76 from the support plate openings 66 and threaded bosses 74 of the resilient member 50, removal of the worn resilient member 50, and mounting of a new, replacement resilient member 50.

In a preferred embodiment, the resilient member 50 includes an elastomeric portion 80 which encases the plate member 72 and at least a portion of the threaded bosses 74. The elastomeric portion 80 does not cover the openings of the threaded bosses 74, thereby permitting the resilient member 50 to be mounted to the frame 40. The elastomeric portion 80 may also define the ground contact surface 70 of the resilient member 50. The elastomeric portion 80 comprises a pliable elastomeric material which will provide sufficient contact with a hard ground surface, such as asphalt or concrete, and will resist wear and damage over time. In an exemplary embodiment, the elastomeric portion 80 includes at least two resilient pads 82. However, it will be appreciated that the elastomeric portion 80 may include a different number of resilient pads 82. For example, the elastomeric portion 80 may include one resilient pad 82 or three or more resilient pads 82.

In a preferred embodiment, the elastomeric portion 80 of the resilient member 50 consists at least partially of a fiber reinforced elastomeric layer, such as masticated rubber. Masticated rubber is an elastomeric material reinforced with fiber or woven fabric belting. In preferred compositions, masticated rubber is a rubber compound consisting of reclaimed, recycled, natural, and/or synthetic rubbers. Masticated rubber is more cost effective to produce and has better grip properties than traditional elastomeric materials, such as traditional rubber. Further, as masticated rubber comprises woven fabric or belting, masticated rubber may have a greater tensile strength than traditional rubbers. Additionally, as masticated rubber is made from recycled materials, masticated rubber is more economical to produce than traditional rubbers or other elastomeric materials.

The fiber reinforced elastomeric material, such as masticated rubber, may be produced in flat sheets which are subsequently cut to a desired shape. The fiber reinforced elastomeric sheets may be any size or thickness. In a preferred embodiment, the fiber reinforced elastomeric sheets are between a thickness of about ⅛ inches and about 1 inch. The cut sheets are then formed into resilient pads 82 which are then arranged in a stacked manner.

Turning to FIGS. 8 through 13, exemplary inventive resilient members 50 are depicted. The exemplary resilient members 50 include resilient pads 82 disposed substantially parallel to the plate member 72 such that, when the resilient member 50 is secured to the stabilizer pad 12, the resilient pads 82 are parallel to the support plate 42 and thereby substantially horizontal and parallel to a horizontal ground surface when the stabilizer pad 12 is in contact with the ground. In a preferred embodiment, the resilient pads 82 include at least one layer or sheet of fiber reinforced elastomeric material, such as masticated rubber. However, it will be appreciated that the resilient pads 82 may include more than one layer or sheet of fiber reinforced elastomeric sheets, such as two or more. FIGS. 8 through 10 depict an exemplary resilient member 50 which includes two resilient pads 82 and FIGS. 11 through 13 depict an exemplary resilient member 50 which includes three resilient pads 82. While the exemplary resilient members 50 are depicted as having two or three resilient pads 82, it is appreciated that the resilient member 50 may have any number of resilient pads 82. For example, the resilient member 50 may have one resilient pad 82 or may have four or more resilient pads 82.

As shown in FIGS. 9 and 10 and FIGS. 12 and 13, one of the resilient pads 82 of the resilient member 50 defines an elastomeric envelope 84 which at least partially encases the plate member 72 and at least partially surrounds the mounts, such as the threaded bosses 74, of the resilient member 50. In one exemplary embodiment, the elastomeric envelope 84 includes two sheets of fiber reinforced elastomeric material, with one sheet disposed on the first side 73 of the plate member 72 and one sheet disposed on the second side 75 of the plate member 72. In a preferred embodiment, the top sheet of fiber reinforced elastomeric material which defines the elastomeric envelope 84 is pre-cut to include holes or other openings corresponding to the threaded bosses 74 when the elastomeric envelope 84 is secured around the plate member 72 permitting the bolts 76 to be received in the threaded bosses 74 of the resilient member 50 and the openings 66 in the support plate 42, thereby securing the resilient member 50 to the frame 40. However, it will be appreciated that the top sheet may be cut after the sheets have been secured around the resilient plate member 72 to form the elastomeric envelope 84. The two sheets may be fastened or secured together around the plate member 72 by any means known in the art. For example, the two fiber reinforced elastomeric sheets may be bolted, glued, compression molded, or stapled together, or secured together by any other method known in the art to fasten or otherwise secure two sheets of elastomeric material together.

In a second exemplary embodiment, the elastomeric envelope 84 is created by wrapping, folding, or otherwise encasing the plate member 72 with a single sheet of fiber reinforced elastomeric material and then securing the sheet around the plate member 72. In a preferred embodiment, the single sheet of fiber reinforced elastomeric material is pre-cut to include holes or other openings corresponding to the threaded bosses 74 when the elastomeric envelope 84 is secured around the plate member 72 permitting the bolts 76 to be received in the threaded bosses 74 of the resilient member 50 and the openings 66 in the support plate 42 thereby securing the resilient member 50 to the frame 40. However, it will be appreciated that the top sheet may be cut after the sheet has been secured around the resilient plate member 72 to form the elastomeric envelope 84. The fiber reinforced elastomeric sheet may be fastened or secured around the plate member 72 by any means known in the art. For example, the free ends of the sheet may be bolted, glued, compression molded, or stapled together, or secured together by any other method known in the art to fasten or otherwise secure two sheets of elastomeric material together.

As shown in FIGS. 8-13, the resilient pad 82 defining the elastomeric envelope 84 may also have a first surface 85 disposed above and substantially parallel to the first side 73 of the plate member 72 and a second surface 87 disposed below and substantially parallel to the second side 75 of the plate member. While the terms above and below are relative in relation to a stabilizer pad 12 which may be positioned or otherwise moved in various orientations, it will be appreciated that the first surface 85 is above the member plate 72 and the second surface 87 is below the member plate 72 when the resilient member 50 is in the orientation depicted in FIGS. 8-13. The first and second surfaces 85, 87 are substantially planar and continuous apart from the portions of the first surface 85 that is disposed around the mounts or threaded bosses 74. The resilient pad 82 may also have a longitudinal axis L which extends along the length of the longest portion of the resilient pad 82 (along line C-C in FIGS. 8 and 11). When the resilient pad 82 is attached around the plate member 72, the first surface 85, second surface 87, and longitudinal axis L of the resilient pad 82 are substantially parallel to the plate member 82. When the resilient member 50 is attached to the stabilizer pad 12, the first surface 85, second surface 87, and longitudinal axis L are substantially parallel to the support plate 42.

The resilient member 50 may further include a second resilient pad 82 disposed below the first resilient pad 82 which defines the elastomeric envelope 84. The second resilient pad 82 may comprise an elastomeric material. In a preferred embodiment, the second resilient pad 82 comprises a single sheet of fiber reinforced elastomeric material and is substantially the same shape as the first resilient pad 82. However, it will be appreciated that two or more sheets of fiber reinforced elastomeric material may be secured, pieced, or otherwise attached together to define the second resilient pad 82. The second resilient pad 82 may be attached to the first resilient pad 82 substantially beneath and parallel to the first resilient pad 82. As a result, the first and second resilient pads 82 are substantially parallel to the plate member 72 which is substantially parallel to the support plate 42 when the resilient member 50 is attached to the frame 40. In such an orientation, the bottom surface of the second resilient pad 82 defines a substantially horizontal and continuous ground contact surface 70 when the stabilizer pad 12 is in contact with the ground surface. The two resilient pads 82 may be secured together by any method known in the art. For example, the two pads may be bolted, glued, compression molded, or stapled together, or secured together by any other method known in the art to fasten or otherwise secure two sheets of elastomeric material together.

As shown in FIGS. 8-13, the second resilient pad 82 may also have a top or first surface 85 and a bottom or second surface 87 which are substantially planar and continuous. When the first and second resilient pads 82 are attached, the second surface 87 of the first resilient pad 82 may abut or be adjacent to the first surface 85 of the second resilient pad 82. The resilient pad 82 may also have a longitudinal axis L which extends along the length of the longest portion of the resilient pad 82 (along line C-C in FIGS. 8 and 11). When the second resilient pad 82 is attached to the first resilient pad 82, the first surface 85, second surface 87, and longitudinal axis L of the resilient pad 82 are substantially parallel to the plate member 82. When the resilient member 50 is attached to the stabilizer pad 12, the first surface 85, second surface 87, and longitudinal axis L are substantially parallel to the support plate 42. In a preferred embodiment, the second surface 87 of the second resilient pad 82 defines the a substantially continuous ground contact surface 70.

In a further preferred embodiment, the resilient member 50 may include one or more fabric layers 86 disposed between the resilient pads 82. The fabric layer 86 may be one or more fabric cloths, layers of woven fabric material, or any fabric materials known in the art. The fabric layer 86 may be substantially the same width and shape as the resilient pads 82 or may be smaller than the resilient pads 82. The resilient pads 82 may be secured or otherwise attached together around the fabric layers 86 by any method known in the art or described above.

Turning to FIGS. 11 through 13, the resilient member 50 may include a third resilient pad 82 disposed below the second resilient pad 82. The third resilient pad 82 may comprise an elastomeric material. In a preferred embodiment, the third resilient pad 82 comprises a single sheet of fiber reinforced elastomeric material. However, it will be appreciated that two or more sheets of fiber reinforced elastomeric material may be secured together to define the third resilient pad 82. The third resilient pad 82 may be attached to the second resilient pad 82 substantially beneath and parallel to the second resilient pad 82. As a result, the first, second, and third resilient pads 82 are substantially parallel to the plate member 72 which is substantially parallel to the support plate 42 when the resilient member 50 is attached to the frame 40. In such an orientation, the bottom surface of the third resilient pad 82 defines a substantially horizontal and continuous ground contact surface 70 when the stabilizer pad 12 is in contact with the ground surface. In a further preferred embodiment, the resilient member 50 may include a fabric layer 86 disposed between the second and third resilient pads 82. The second and third resilient pads 82 may be attached or secured together by any means used to secure the first and second resilient pads 82.

As shown in FIGS. 11-13, the third resilient pad 82 may also have a top or first surface 85 and a second or bottom surface 87 which are substantially planar and continuous. When the second and third resilient pads 82 are attached, the second surface 87 of the second resilient pad 82 may abut or be adjacent to the first surface 85 of the third resilient pad 82. The third resilient pad 82 may also have a longitudinal axis L which extends along the length of the longest portion of the resilient pad 82 (along line C-C in FIG. 11). When the third resilient pad 82 is attached to the second resilient pad 82, the first surface 85, second surface 87, and longitudinal axis L of the third resilient pad 82 are substantially parallel to the plate member 82. When the resilient member 50 is attached to the stabilizer pad 12, the first surface 85, second surface 87, and longitudinal axis L are substantially parallel to the support plate 42. In a preferred embodiment, the second surface 87 of the third resilient pad 82 defines the a substantially continuous ground contact surface 70.

In a preferred embodiment, the resilient member 50 has the same thickness whether two, three, or any other number of resilient pads 82 are included. In the illustrated embodiment, the resilient member 50 has a thickness between about 30 and about 60 millimeters, such as between about 40 and about 50 millimeters, such as about 44 millimeters. However, it will be appreciated that other shapes and sizes are contemplated.

In a further exemplary embodiment, illustrated in FIGS. 14 through 19, the resilient member 50 may include an elastomeric coating 88 substantially disposed around the plate member 72, resilient pads 82, and fabric layers 86. In a preferred embodiment, the elastomeric coating 88 is a traditional elastomeric material which is coated or molded over the plate member 72, resilient pads 82, and fabric layers 86 to give the resilient member 50 a continuous elastomeric outside surface apart from the exposed threaded bosses 74. The elastomeric coating 88 may completely surround the plate member 72, resilient pads 82, and fabric layers 86 such that the elastomeric coating 88 defines the ground contact surface 70. However, in other embodiments, the elastomeric coating 88 may only partially surround the plate member 72, resilient pads 82, and fabric layers 86 and the bottom surface of the bottom resilient pad 82 may define the ground contact surface 70. The elastomeric coating 88 does not cover the openings of the threaded bosses 74 and thereby permits the bolts 76 to be received in the threaded bosses 74, thereby permitting attachment of the resilient member 50 to the frame 40.

While the elastomeric coating 88 has been described as being disposed around a resilient member 50 having two or three resilient pads 82, it will be appreciated that any number of resilient pads 82 may be disposed within the elastomeric coating 88. For example, the elastomeric coating 88 may be disposed around one resilient pad 82 or may be disposed around three or more resilient pads 82.

INDUSTRIAL APPLICABILITY

The disclosed stabilizer pad 12 may be integrated with stabilizer legs 14 of many mobile work machines including, but not limited to, earth-moving equipment, mining machines and other construction or agriculture machinery. For example, the stabilizer pad could be used in combination with stabilizer legs of backhoes, miners, cranes, tractors, excavators, articulated trucks, haul trucks, generator sets, etc. By incorporating the stabilizer pad 12 of the present disclosure, the stabilizer legs 24 of the work machine 10 may be manufactured more cheaply and the stabilizer legs 24 may still sufficiently grip a ground surface without significant wear. Further, when the stabilizer pad 12 is utilized in ground environments with dirt, rocks, sand, or other type of debris, the continuous horizontal ground contacting surface 70 of the resilient members 50 prevent the debris from getting between adjacent resilient members 50 and thereby causing additional wear and damage to the resilient members 50 and stabilizer pad 12. Moreover, where the stabilizer pad 12 is employed, used or damaged resilient members 50 may easily be replaced with new resilient members 50 that are adapted for mounting onto the stabilizer pad frame 40.

The stabilizer pad 12 includes a resilient member 50 having a ground contact surface 70 which contacts a ground surface when the work machine 10 is in use. The stabilizer pad 12 and, particularly, the resilient member 50 engage the ground to laterally support the machine 10 to maintain a steady and solid working foundation, as well as guard against possible tipping of the machine 10. In maintaining such a foundation, while guarding against possible tipping of the machine 10, the stabilizer pad 12 and resilient member 50 are subjected to large forces which cause the resilient member 50 to wear or otherwise fail. Also, as the resilient member 50 engages surfaces which may be damaged through the transfer of such forces, the resilient member 50 is preferably made from a soft, pliable material, such as an elastomeric material. However, the use of such material for the resilient member 50 often increases the wear rate of the resilient member 50 and causes the resilient member 50 to fail or otherwise require replacing more frequently.

The inventive resilient member 50 used with stabilizer pads 12 include resilient pads 82 disposed substantiality parallel to the frame 40 to define a continuous and horizontal ground contact surface 70. The continuous and horizontal ground contact surface 70 provides an increased engagement surface area between the resilient member 50 and the ground surface and prevents rocks or other debris from becoming lodged between the resilient pads 82 and thereby increasing wear and damage to the resilient pads 82 and resilient member 50. As a result, the inventive stabilizer pad 12 wears or otherwise fails less quickly and requires replacing less often.

The resilient member 50 also includes resilient pads 82 comprising a fiber reinforced material, such as masticated rubber. Masticated rubber is an elastomeric material reinforced with fiber or woven fabric belting. In preferred compositions, masticated rubber is a rubber compound consisting of reclaimed, recycled, natural, and/or synthetic rubbers. Masticated sheets, which are subsequently cut to a desired shape and formed into resilient pads 82, are cheaper to manufacture or otherwise produce than resilient pads 82 made from a single, solid piece of rubber. Additionally, the inclusion of the fiber or woven fabric belting increases the durability of the resilient pads 82 of the resilient member 50, increases the ability of the ground contact surface 70 to grip a ground surface, and increases the overall tensile strength of the resilient pads 82. Further, the woven belted material within the masticated sheets forming the resilient pads 82 prevent large portions of the resilient pad 82 from breaking off or "chunking out." As a result, the resilient member 50 formed of resilient pads 82 comprising masticated rubber wear or fail less quickly than resilient members made from a single piece of rubber and need to be replaced less frequently.

In view of the many possible embodiments to which the principles of the disclosure can be applied, it should be recognized that the illustrated embodiments are only preferred examples and should not be taken as limiting the scope of the disclosure. Rather the scope of the disclosure is defined by the following claims.

It will be appreciated that the foregoing description provides examples of the disclosed apparatus and system. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A resilient member for a stabilizer pad of a work machine, the resilient member comprising:
   a plate member including one or more mounts configured for attachment to a stabilizer leg, the plate member defining a first plane;

a first resilient pad defining an elastomeric envelope which at least partially surrounds the plate member, the first resilient pad including a first surface from which the one or more mounts extend and a second surface opposite the first surface, the first resilient pad defining a second plane; and a second resilient pad attached to the second surface of the first resilient pad, the second resilient pad defining a third plane;

wherein the first and second resilient pads include at least one fiber reinforced elastomeric layer; and wherein the first, second, and third planes are parallel.

2. The resilient member of claim 1, further comprising a continuous ground contact surface.

3. The resilient member of claim 1, further comprising a fabric layer disposed between the first and second resilient pads.

4. The resilient member of claim 1, wherein the second resilient pad comprises a first surface attached to the first resilient pad and a second surface opposite the first surface, wherein the second surface of the second resilient pad is parallel to a ground surface when the resilient member is in contact with the ground surface.

5. The resilient member of claim 1, wherein the elastomeric envelope comprises two elastomeric sheets attached together to surround the plate member.

6. The resilient member of claim 1, wherein the elastomeric envelope comprises one elastomeric sheet secured around the plate member.

7. The resilient member of claim 1, wherein the mounts are threaded bosses.

8. The resilient member of claim 1, further comprising a third resilient pad including a first surface attached to the second resilient pad and a second surface opposite the first surface;

wherein the third resilient pad includes at least one fiber reinforced elastomeric layer.

9. The resilient member of claim 8, wherein the second surface of the third resilient pad is parallel to the plate member.

10. A stabilizer pad for a work machine, the stabilizer pad comprising:

a frame attachable to a stabilizer leg, a resilient member, and a connector for securing the resilient member to the frame;

the resilient member comprising:

a plate member having one or more mounts configured for attachment to the frame;

a first resilient pad defining an elastomeric envelope which at least partially surrounds the plate member and one or more mounts, the first resilient pad having a first longitudinal axis; and a second resilient pad attached to a second surface of the first resilient pad, the second resilient pad having a second longitudinal axis;

wherein the first and second resilient pads include at least one fiber reinforced elastomeric layer and the first and second longitudinal axes are parallel to the frame.

11. The stabilizer pad of claim 10, wherein the elastomeric envelope comprises two elastomeric sheets attached together to surround the plate member.

12. The stabilizer pad of claim 10, wherein the elastomeric envelope comprises one elastomeric sheet secured around the plate member.

13. The stabilizer pad of claim 10, wherein the resilient member further comprises a fabric layer disposed between the first and second resilient pads.

14. The stabilizer pad of claim 10, wherein a surface of the second resilient pad defines a continuous ground contact surface.

15. The stabilizer pad of claim 10, wherein the resilient member further comprises a third resilient pad attached to the second resilient pad, the third resilient pad having a third longitudinal axis.

16. The stabilizer pad of claim 15, wherein the resilient member further comprises a fabric layer disposed between the second and third resilient pads.

17. The stabilizer pad of claim 10, wherein the resilient member further comprises an elastomeric coating which at least partially surrounds the plate member and first and second resilient pads.

18. The stabilizer pad of claim 17, wherein the elastomeric coating defines a continuous ground contact surface which is parallel to the plate member.

19. The stabilizer pad of claim 10, wherein the plate member defines a first plane, the first resilient pad defines a second plane, the second resilient pad defines a third plane, and wherein the first, second, and third planes are parallel.

20. A resilient member for use with a stabilizer leg of a work machine, the resilient member comprising:

a plate member including one or more mounts configured for attachment to the stabilizer leg;

a first resilient pad defining an elastomeric envelope which at least partially surrounds the plate member;

a second resilient pad attached to the first resilient pad;

a third resilient pad attached to the second resilient pad;

a first fabric layer disposed between the first and second resilient pads;

a second fabric layer disposed between the second and third resilient pads; and an elastomeric coating at least partially surrounding the plate member and first, second, and third resilient pads;

wherein the second resilient pad is disposed between the first resilient pad and third resilient pad;

wherein the first, second, and third resilient pads include at least one fiber reinforced elastomeric layer;

wherein the first resilient pad has a first longitudinal axis, the second resilient pad has a second longitudinal axis, and the third resilient pad has a third longitudinal axis, the first, second, and third longitudinal axes being parallel to the plate member; and wherein a second surface of the third resilient pad defines a ground contact surface that is parallel to the plate member.

\* \* \* \* \*